3,418,063
PROCESS FOR DYEING AND PRINTING
CELLULOSE FIBRES
Paul Ulrich and Heinz Peter Schaub, Basel, Switzerland, assignors to Ciba Limited, Basel, Switzerland, a Swiss company
No Drawing. Filed July 12, 1965, Ser. No. 471,400
Claims priority, application Switzerland, July 14, 1964, 9,225/64
12 Claims. (Cl. 8—21)

The present invention relates to a process for coloring, i.e. dyeing or printing, native or synthetic cellulose fibers with dyestuffs that are water-insoluble or of which at most only traces are soluble in water, the material to be dyed being impregnated or printed with an aqueous preparation containing at least 10%, referred to the weight of the preparation as a whole, of at least one compound of the formula

where D represents oxygen, sulphur or NH; Y represents a primary, secondary or tertiary amino group, and Z a primay, secondary or tertiary amino group, an alkyl, alkoxy or aryl group, and the material thus treated is then subjected to a treatment with dry heat.

According to this invention cellulose fibres are dyed or printed, including both natural and synthetic cellulose material suitable for use in the textile industry. As natural materials there may be mentioned linen, hemp, sisal and especially cotton. From among suitable synthetic cellulose materials there may be mentioned above all regenerated cellulose fibres, such as rayon and spun rayon. Viscose rayon modified by special precipitation baths can likewise be treated in a satisfactory manner. The present process is suitable for dyeing or printing not only cellulosic materials but also polyester fibres, especially fibres from terephthalic acid and ethyleneglycol. In this connection it has been observed that mixed weaves from cellulose fibres and polyester fibres are particularly suitable, as are mixed weaves from cellulose fibres and synthetic polyamides, especially those from ε-caprolactam, hexamethylene, diadipamide or ω-aminoundecanoic acid.

The dyestuffs to be used in the present process should be water-insoluble or at most traces thereof should be soluble in water. Such dyestuffs are free from acid groups imparting solubility in water, that is to say they are free from sulphonic acid groups and carboxyl groups. On the other hand, they may certainly contain other groups which, while they may cause a certain increase of the solubility in water, do not cause a pronounced solubility in water of the dyestuff molecule concerned. Such groups are, for example, the sulphonamide and the alkylsulphone groups. Likewise suitable are unreduced vat dye pigments belonging to the anthraquinoid or to the indigoid series. It is also possible to use water-insoluble azo dyes containing one or several azo bridges and metal in a complex union. Particularly suitable are however the so-called disperse dyestuffs, that is to say coloured organic compounds of which at most only traces are soluble in water and which dye acetate rayon from an aqueous suspension. As a rule they are readily soluble in acetone but substantially insoluble in could water. All these dyestuffs may contain external reactive groups, that is to say groups that cause the formation of a covalent bond with the substrate and/or cause cross-linking of the dyestuff molecules with one another.

Since these dyestuffs are insoluble in water, the degree of their dispersion is of special significance. To ensure satisfactory results the dyestuffs must be used in a finely dispered form; this can be achieved by finely grinding them before use, and in this connection the additional use of a suitable dispersant may be of advantage.

According to the present invention the aqueous preparation must contain at least one compound of the formula

where D represents oxygen, sulphur or NH; Y represents a primary, secondary or tertiary amino group, and Z a pimay, secondary or tertiary amino goup, an alkyl, alkoxy or aryl group. Preferred representatives of this group are the compounds of the formulae

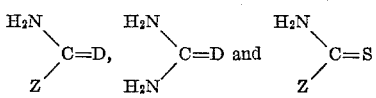

where D and Z have the above meaning.

Compounds of the formula

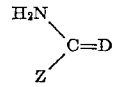

are compounds of urea, thiourea or guanidine, aliphatic or aromatic acylamides, thioacylamides or amidines, or urethanes or thiourethanes. Compounds belonging to this group that give particularly favourable results are the compounds of sulphur, that is to say compounds of the formula

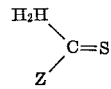

such, for example, as thiosemicarbazide, allythiourea and above all thiourea and thioacetamide.

It is also possible for the residues Y and Z to be linked together so as to form cyclic compounds; such compounds are, for example, hydantoin or uracil.

The amounts of these compounds to be used may vary within wide limits but they should not be less than 10% and, as a rule, not greater than 50%, referred to the weight of the aqueous preparation as a whole. Preferred amounts are within the range from 15 to 30%. If desired, the substances to be used may be applied in the form of a combination. It is also possible to apply the dyestuffs and chemicals required for the performance of this process to the substrate separately. Thus, for example, the fibrous material may first be padded with the dyestuff solution and then only slop-padded with the separately prepared chemical liquor. The reverse sequence is likewise possible, the padding with the chemical liquor being performed first and the impregnation with the dyestuff solution afterwards. The aqueous preparation is applied by known methods. Thus, for example, dyeing may be performed by impregnation e.g. on a padder, and printing by any conventional printing method e.g. on a roller printing machine or by screen printing. The aqueous preparation should be used at a temperature from 15 to 80°, preferably from 20 to 40° C.

The material treated with the aqueous preparation is then subjected to a dry heat treatment by known method, using a temperature within the range from about 120 to 250° C. The duration of the heat treatment may vary within wide limits but is in general from 10 seconds to 5 minutes. If desired, the impregnated material may be pre-dried before being exposed to the dry heat; this step may be performed at 70 to 90° C. and is particularly useful in printing.

To remove any excess dyestuff that has not been fixed and other residues of dye preparation it is as a rule advisable to clean the material by treatment in an aqueous liquor which may contain surface-active detergents and/or alkalies and/or acids.

Apart from the compounds required for the performance of this invention the aqueous preparations may further contain the additives conventionally used in dyeing and printing, for example surface-active anionic or nonionic assistants, thickeners, electrolytes, acids or bases. When thickeners are used—which may be of natural or synthetic origin, and whose activity depends on swelling or emulsion—it must be ensured that they are compatible with the dry liquor, which means that the thickener must be chosen according to whether the liquor is of acid or alkaline reaction and this in turn depends on the dyestuff used in the individual case. The aqueous preparation may further contain organic polar or non-polar solvents e.g. formamide, dimethylformamide, tetrahydrothiophene-1-dioxide or the like; or butanol, benzyl alcohol, diethylketone or the like. When dyestuffs are used that contain external, reactive groups or groupings, such, for example, as hydroxyl, amino, sulphonamide or carbonamide groups, the addition of a so-called cross-linking agent has proved to be particularly valuable. Cross-linking agents are bifunctional or polyfunctional compounds capable of transforming large molecules with at least two reactive centres by formation of intermolecular bridges into networks of a two-dimensional or three-dimensional structure. The cross-linking agent may be introduced as a bridge member or it may simply cause a joining of the reactive centres. They may link together dyestuff molecules with dyestuff molecules, or dyestuff molecules with the fibrous material. Such compounds may be, for example, isocyanates or aliphatic or aromatic compounds; or they may be salts, for example bisulphite adducts of such isocyanates. Compounds that likewise possess cross-linking properties and are therefore also suitable for use in the present process, are compounds of the acrylamide or vinylsulphone type or compounds that furnish them, for example quaternary compounds of the corresponding β-chloroethyl or β-sulphoethyl compounds. Another group of suitable compounds comprises polyvalent, saturated nitrogen heterocycles, and among them those are particularly suitable which are derived from an N-substituted hexahydro-1,3,5-triazine. As examples of such compounds there may be mentioned hexahydro-triacryloyl-1,3,5-triazine and hexahydro-tri-(ω-glycidylpropionyl)-1,3,5-triazine.

Further suitable cross-linking compounds are halogenalkyls, especially chloroethyl and chloromethyl compounds and their onium compounds. The term onium compounds designates complex compounds in which the central atom has one covalency more than the number corresponding to the number of its stoichiometric valency electrons. The associated anion is linked with the cationic complex through an ionic relation. These compounds arise from the addition of a proton on to the reactive, lone electron pair of the central atom of the basic hydrogen compound. However, the hydrogen may be replaced partially or wholly by organic residues. As the foremost examples of such onium complexes there may be mentioned the ammonium, oxonium, phosphonium and sulphonium compounds.

Apart from cross-linking agents there may be added film-forming compounds to the dye preparations, especially compounds formed by polycondensation or polymerization, e.g. acrylic resins, epoxy resins or aminoplasts.

Depending on the type of dyestuff, cross-linking agent or film-former used there may be further added to the dye preparation an acid acceptor such as an alkali metal hydroxide or an alkali metal salt or alkaline earth metal salt of alkaline reaction, or an acid donor such as an inorganic acid or organic acid or an acid salt of such an acid.

After setting the dyestuff by the dry heat treatment the dyed or printed material may be subjected to a treatment with usual after-treating agents, if desired after first having after-washed the material. This after-treatment concerns mainly dressing with substances that modify the handle, enhance the crease-resistance, improve the wet fastness or the like.

The present process makes it possible to dye or print, above all, mixed weaves from cellulose fibres and synthetic polyamide or polyester fibres with a single type of dyestuff. The resulting light to dark shades obtained are substantially level and possess good fastness properties.

Parts in the following examples are by weight.

Example 1

A printing paste is prepared from 40 parts of the dyestuff of the formula

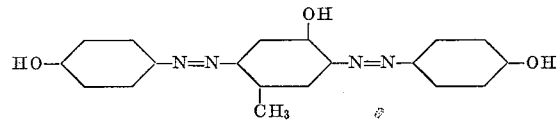

300 parts of urea
500 parts of a 5% aqueous sodium alginate thickening and
160 parts of water.

and used for printing a cotton fabric on a roller printing machine. The printed fabric is dried, exposed for 60 seconds to dry heat at 210° C. and then rinsed in cold water. The resulting orange-red print is substantially stronger than when urea is omitted.

When, instead of the above dyestuff, equal parts of the dyestuff of the formula

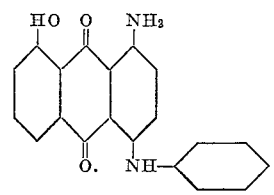

are used, a strong blue print is obtained.

When the cotton fabric is replaced by a mixed weave from cotton and a synthetic polyamide fibre from hexamethylene diadipamide, and the dry heat treatment is carried out at 180° C., prints with good tone-in-tone cover are obtained.

When, instead of a cotton fabric, a fabric from regenerated cellulose of polynosic material is printed, similar strong prints are obtained.

Example 2

A printing paste is prepared from 40 parts of the dyestuff of the formula

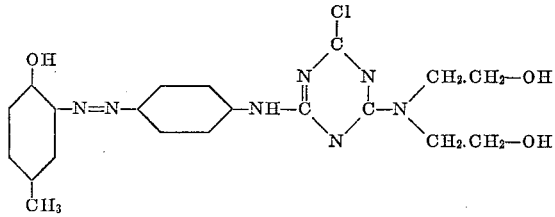

200 parts of urea
50 parts of thiourea
20 parts of sodium carbonate
500 parts of the emulsion thickening described below and
190 parts of water and printed on a cotton fabric which is then dried. The dry fabric is exposed for 60 seconds to dry heat at 210°

C., then rinsed in cold water and finally dried. The resulting yellow print displays good properties of fastness and is substantially stronger than when urea and thiourea are omitted The emulsion thickening used above is prepared from 200 parts of a 125% solution of an adduct from 1 mol of oleyl alcohol and 80 mols of ethylene oxide, cross-linked with about 1% of hexamethylene diisocyanate, in
150 parts of water, which is mixed by means of a high-speed stirrer with
650 parts of lacquer benzine Instead of the above dyestuff there may be used equal parts of the dyestuff of the formula

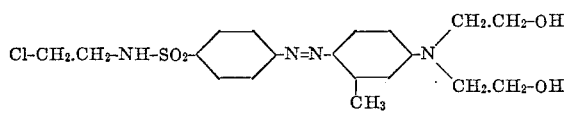

which produces an orange-red print which is fast to washing.

If the urea-thiourea combination is replaced by 300 parts, of symmetrical dimethylurea, phenylurea, acetamide, guanidine tetra-methylurea or assymmetrical dimethyl urea, similar good results are achieved.

Example 3

A printing paste is prepared from 20 parts of the dyestuff of the formula

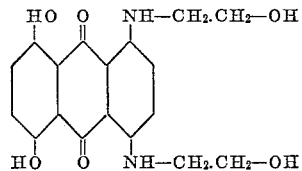

200 parts of carbamic acid ethyl ester
50 parts of thiourea
30 parts of hexahydro-triacryloyl-1,3,5-triazine
20 parts of sodium carbonate
500 parts of the emulsion thickening described in Example 2 and
180 parts of water, and printed on a cotton fabric which is then dried. The dried fabric is exposed for 60 seconds to dry heat at 210° C., then rinsed in cold and in warm water and finally dried. The resulting turquoise print displays good wet fastness.

Instead of the cotton fabric there may be used a mixed weave from equal parts of cotton and polyester fibres, and both types of fibres are dyed equally strongly. If, on the other hand, the addition of carbamic acid ethyl ester and thiourea is omitted, the cotton share of the weave is dyed a much weaker shade.

Similar results are obtained when hexahydrotriacryloyl-1,3,5-triazine is replaced by an equivalent amount of one of the following compounds:

(a) $CH_2=CH-SO_2-CH=CH_2$ (b) $OCN-\langle\rangle-SO_2-\langle\rangle-NCO$ (c) $NaSO_3-OCNH-(CH_2)_6-NHCO-SO_3Na$ (d) $NaSO_3-OCNH-\langle\rangle-SO_2-\langle\rangle-CH_3$
        $HNCO-SO_3Na$ (e) $NaSO_3-OCNH-\langle\rangle-CH_2.CH_2-NHCO-SO_3Na$

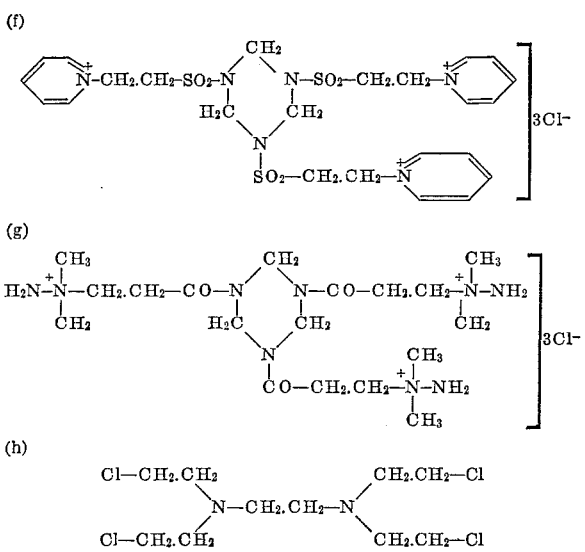

When the above dyestuff is replaced by equal parts of the dyestuff of the formula

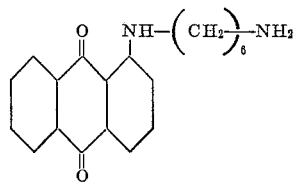

a blue print having similar properties results.

Example 4

A printing paste is prepared from 40 parts of the second dyestuff mentioned in Example 1
200 parts of urea
50 parts of semicarbazide
500 parts of the emulsion thickening described in Example 2 and
250 parts of water, and printed on a cotton fabric which is then dried and exposed for 60 seconds to dry heat at 210° C. This thermoset print is then impregnated on a padder with a solution which contains per 1000 parts of water:

80 parts of a 50% solution of equal parts of dimethylolethyleneurea and hexamethylolmelamine-hexamethyl ether
15 parts of the compound of the formula

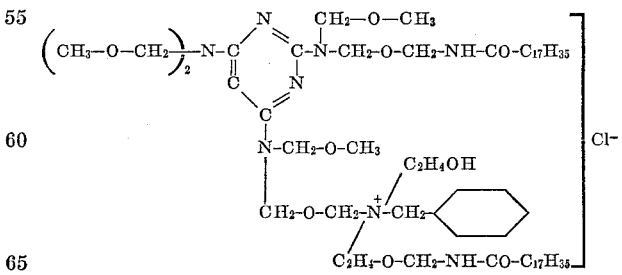

5 parts of a 25% aqueous solution of the adduct from 8 mols of ethylene oxide with 1 mol of para-tertiary octylphenol and
15 parts of magnesium chloride.

The fabric is squeezed to a weight increase of about 70%, dried and exposed for 4 minutes to dry heat at 150° C., then rinsed, soaped for 5 minutes at 40° C. in a solution containing per 1000 parts of water, 2 parts of heptadecenyl benzimidazole-sulphonate and 1 part of polyphosphate, once more rinsed and finally dried. The resulting blue print is wet-fast.

Example 5

A printing paste is prepared from 40 parts of the second dyestuff mentioned in Example 1
100 parts of urea
100 parts of semicarbazide
50 parts of thio-diethyleneglycol
50 parts of diglycidyl ether
5 parts of zinc fluoborate
500 parts of the emulsion thickening described in Example 2 and
155 parts of water, and printed on a cotton fabric which is then treated as described in Example 3. The resulting blue print possesses good fastness properties.

The diglycidyl ether may be replaced by an equivalent amount of a reaction product from butanediol-(1,4) and epichlorohydrin.

Example 6

A printing paste is prepared from 40 parts of the first dyestuff described in Example 3
100 parts of urea
100 parts of thiourea
50 parts of tetrahydrothiophene-1-dioxide
50 parts of a copolymer from acrylic acid, acrylates and acrylonitrile
5 parts of ammonium chloride
500 parts of the emulsion thickening described in Example 2 and
155 parts of water, and printed on a mixed weave from cotton and polyester fibres which is then treated as described in Example 1. A turquoise print is obtained in which both cotton and polyester fibres display a good tone-in-tone cover.

Example 7

A padding liquor is prepared which contains in 1000 parts of water 40 parts of the second dyestuff mentioned in Example 1
300 parts of urea
50 parts of hexamethylolmelamine hexamethyl ether and
5 parts of ammonium chloride and used for impregnating on a padder a cotton fabric which is then squeezed to a weight increase of 70%. The fabric is dried, exposed for 60 seconds to dry heat at 210° C., rinsed in cold water, then soaped for 15 minutes at 60° C. as described in Example 4, once more rinsed and finally dried. The resulting blue dyeing is wet-fast.

Example 8

A padding liquor is prepared containing 610 parts of water
40 parts of the first dyestuff mentioned in Example 3
200 parts of urea
100 parts of thiourea
30 parts of hexahydro-triacryloyl-1,3,5-triazine and
20 parts of sodium carbonate and used for impregnating on a padder a mixed weave from cotton and polyester fibres which is then squeezed to a weight increase of 70%. The fabric is dried, exposed for 60 seconds to dry heat at 210° C., rinsed in cold water and finally dried. The resulting turquoise shade displays a good tone-in-tone cover.

Example 9

A printing paste is prepared from 40 parts of the dyestuff of the formula

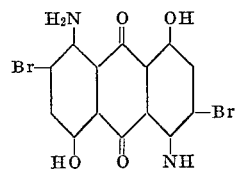

200 parts of urea
100 parts of formamide
50 parts of trisaziridinyl-phosphine oxide
20 parts of a 33% aqueous solution of diammonium phosphate
500 parts of the emulsion thickening described in Example 2 and
90 parts of water and printed on a cotton fabric which is then dried. The dry fabric is exposed for 60 second to dry heat at 210° C., rinsed in cold and warm water and finally dried. The resulting blue print displays good properties of fastness.

Example 10

A printing paste is prepared from 10 parts of the dyestuff of the formula

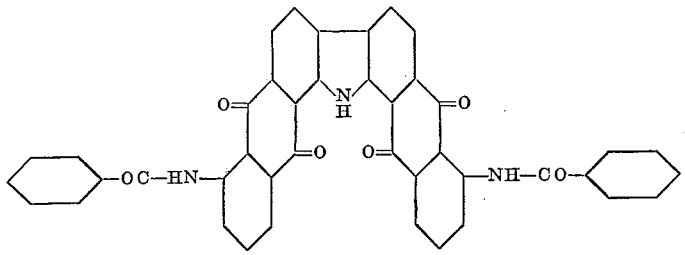

300 parts of urea
500 parts of 10% aqueous thickening of carboxymethyl cellulose and
190 parts of water and used for printing a mixed weave from cotton and polyester fibres which is then dried. The dry fabric is exposed for 60 seconds to dry heat at 210° C., rinsed in cold and in warm water and finally dried. The resulting strong orange-red print displays a good tone-in-tone cover.

When the above dyestuff is replaced by equal parts of the dyestuff of the formula

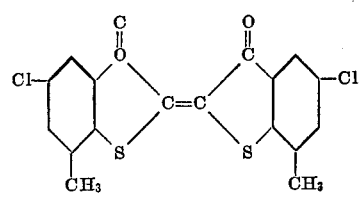

a red print is obtained which has similar good properties.

Example 11

A printing paste is prepared from 20 parts of the 1:2-cobalt complex dyestuff which contains for every atom of cobalt two molecules of the dyestuff of the formula

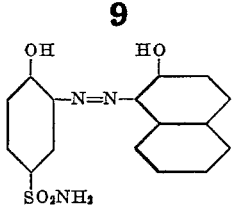

200 parts of urea
100 parts of symmetrical dimethylurea
500 parts of the emulsion thickening described in Example 2
30 parts of hexahydro-triacryloyl-1,3,5-triazine
20 parts of sodium carbonate and
130 parts of water and used for printing a mixed weave from cotton and polyester fibres which is then dried. The printed and dried fabric is then exposed for 60 seconds to dry heat at 210° C., rinsed in cold and in warm water and finally dried. The resulting strong red print displays a good tone-in-tone cover and possesses good properties of fastness Example 12

A printing paste is prepared from 30 parts of the dyestuff of the formula

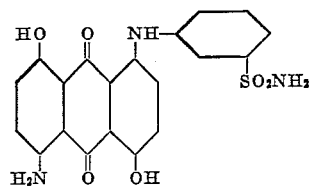

300 parts of urea
20 parts of sodium carbonate
50 parts of the compound of the formula

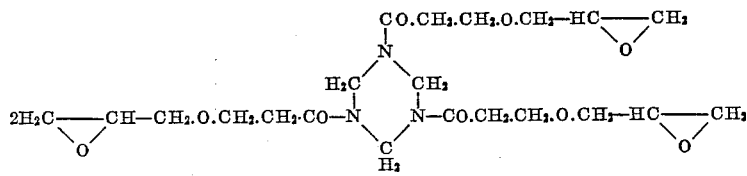

500 parts of the emulsion thickening described in Example 2 and
100 parts of water and printed on a cotton fabric which is then dried. The dried fabric is exposed for 60 seconds to dry heat at 210° C., rinsed in cold and in warm water and finally dried. The resulting strong blue print possesses good properties of fastness.

What is claimed is:

1. Process for coloring cellulosic-polyester fiber blends comprising impregnating the fibres with an aqueous preparation containing dyestuffs at the most traces of which are soluble in water and 10–30%, calculated on the weight of the whole preparation, of at least one compound of the formula

wherein D is a member selected from the group consisting of oxygen, sulfur and the grouping NH, Y is a member selected from the group consisting of a primary, secondary and tertiary amino group, Z is a member selected from the group consisting of a primary, secondary and tertiary amino group, an alkyl and an alkoxy group and then subjecting the fibres so treated to a treatment with dry heat at a temperature from 120–250° C. for 10 seconds to 5 minutes.

2. Process for coloring cotton-polyester fiber blends comprising impregnating the fiber with an aqueous preparation containing dyestuffs at the most traces of which are soluble in water and 10–30%, calculated on the weight of the whole preparation, of at least one compound of the formula

wherein D is a member selected from the group consisting of oxygen, sulfur and the grouping NH, Y is a member selected from the group consisting of a primary, secondary and tertiary amino group, Z is a member selected from the group consisting of a primary, secondary and tertiary amino group, an alkyl and an alkoxy group and then subjecting the fibres so treated to a treatment with dry heat at a temperature from 120–250° C. for 10 seconds to 5 minutes.

3. Process for coloring cotton-polyester fiber blends comprising impregnating the fiber with an aqueous preparation containing dyestuffs at the most traces of which are water-soluble selected from the group consisting of vat dyestuffs, reactive dyestuffs and disperse dyestuffs and 10–30%, calculated on the weight of the whole preparation, of at least one compound of the formula

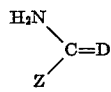

wherein D is a member selected from the group consisting of oxygen, sulfur and the grouping NH, Z is a member selected from the group consisting of a primary, secondary and tertiary amino group, an alkyl and an alkoxy group and then subjecting the fibres so treated to a treatment with dry heat at a temperature from 120–250° C. for 10 seconds to 5 minutes.

4. Process for coloring cotton-polyester fiber blends comprising impregnating the fiber with an aqueous preparation containing vat dyestuffs at the most traces of which are water-soluble and 10–30%, calculated on the weight of the whole preparation, of at least one compound of the formula

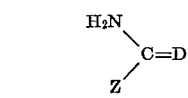

wherein D is a member selected from the group consisting of oxygen, sulfur and the grouping NH, Z is a member selected from the group consisting of a primary, secondary and tertiary amino group, an alkyl and alkoxy group, and then subjecting the fibres so treated to a treatment with dry heat at a temperature from 120 to 250° C. for 10 seconds to 5 minutes.

5. Process for coloring cotton-polyester fiber blends comprising impregnating the fiber with an aqueous preparation containing reactive dyestuffs at the most traces of which are water-soluble and 10–30%, calculated on the weight of the whole preparation, of at least one compound of the formula

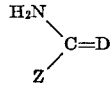

wherein D is a member selected from the group consisting of oxygen, sulfur and the grouping NH, Z is a member selected from the group consisting of a primary, secondary and tertiary amino group, an alkyl and alkoxy group, and then subjecting the fibres so treated to a treatment with dry heat at a temperature from 120 to 250° C., for 10 seconds to 5 minutes.

6. Process for coloring cotton-polyester fiber blends comprising impregnating the fiber with an aqueous preparation containing disperse dyestuffs at the most traces of which are water-soluble and 10–30%, calculated on the weight of the whole preparation, of at least one compound of the formula

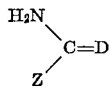

wherein D is a member selected from the group consisting of oxygen, sulfur and the grouping NH, Z is a member selected from the group consisting of a primary, secondary and tertiary amino group, an alkyl and alkoxy group, and then subjecting the fibres so treated to a treatment with dry heat at a temperature from 120 to 250° C. for 10 seconds to 5 minutes.

7. Process for coloring cotton-polyester fiber blends comprising impregnating the fiber with an aqueous preparation containing disperse dyestuffs at the most traces of which are water-soluble and 10–30%, calculated on the weight of the whole preparation, of at least one compound of the formula

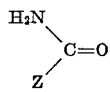

wherein Z is a member selected from the group consisting of a primary, secondary and tertiary amino group, an alkyl and alkoxy group, and then subjecting the fibres so treated to a treatment with dry heat at a temperature from 120 to 250° C. for 10 seconds to 5 minutes.

8. Process for coloring cotton-polyester fiber blends comprising impregnating the fiber with an aqueous preparation containing disperse dyestuffs at the most traces of which are water-soluble and 10–30%, calculated on the weight of the whole preparation, of at least one compound of the formula

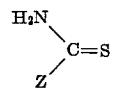

wherein Z is a member selected from the group consisting of a primary, secondary and tertiary amino group, an alkyl and alkoxy group, and then subjecting the fibres so treated to a treatment with dry heat at a temperature from 120 to 250° C. for 10 seconds to 5 minutes.

9. Process for coloring a cotton-polyester fabric comprising impregnating the fabric with an aqueous preparation containing a disperse dyestuff and 10–30%, calculated on the weight of the whole preparation, of urea, and then subjecting the fabric so treated to the action of dry heat at a temperature of 210° C for 60 seconds.

10. Process for coloring a mixed weave of cotton and polyester fibers comprising impregnating the fibers with an aqueous preparation containing a disperse dyestuff and 10–30%, calculated on the weight of the whole preparation of urea, and then subjecting the fabric so treated to the action of dry heat at a temperature of 210° C. for 60 seconds.

11. Process for coloring a mixed weave of cotton and polyester fibres comprising impregnating the fibres with an aqueous preparation containing a disperse dyestuff having an $N_2N-SO_2-$ group and 10–30%, calculated on the weight of the whole preparation of urea and a cross-linking agent and then subjecting the fabric so treated to the action of dry heat at a temperature of 210° C. for 60 seconds.

12. Process for coloring a mixed weave of cotton and polyester fibres comprising impregnating the fibers with an aqueous preparation containing a disperse dyestuff and 10–30%, calculated on the weight of the whole preparation, of a mixture of urea and thiourea and then subjecting the fabric so treated to the action of dry heat at a temperature of 210° C. for 60 seconds.

References Cited

UNITED STATES PATENTS

| | | | |
|---|---|---|---|
| 2,930,670 | 3/1960 | Bradshaw et al. | 8—85 |
| 2,928,712 | 3/1960 | Bradshaw | 8—85 |
| 3,138,430 | 6/1964 | Rafael et al. | 8—62 |

FOREIGN PATENTS

| | | |
|---|---|---|
| 1,273,670 | 9/1961 | France. |
| 340,572 | 12/1930 | Great Britain. |
| 747,622 | 4/1956 | Great Britain. |
| 846,505 | 8/1960 | Great Britain. |

OTHER REFERENCES

L. Robishaw: De Tex, 23, No. 2, February 1964, pp. 119–122.

NORMAN G. TORCHIN, *Primary Examiner.*

T. J. HERBERT, JR., *Assistant Examiner.*

U.S. Cl. X.R.

8—55, 54.2, 85